United States Patent
Gygi et al.

(10) Patent No.: US 8,839,037 B2
(45) Date of Patent: Sep. 16, 2014

(54) HARDWARE QUEUE FOR TRANSPARENT DEBUG

(75) Inventors: Carl E. Gygi, Colorado Springs, CO (US); Craig R. Chafin, Colorado Springs, CO (US)

(73) Assignee: LSI Corporation, San Jose, CA (US)

( * ) Notice: Subject to any disclaimer, the term of this patent is extended or adjusted under 35 U.S.C. 154(b) by 339 days.

(21) Appl. No.: 13/253,208

(22) Filed: Oct. 5, 2011

(65) Prior Publication Data
US 2013/0091388 A1 Apr. 11, 2013

(51) Int. Cl.
G06F 11/00 (2006.01)
G06F 11/36 (2006.01)

(52) U.S. Cl.
CPC .................. *G06F 11/366* (2013.01)
USPC ........................................... 714/27

(58) Field of Classification Search
USPC ............................... 714/30, 39, 27
See application file for complete search history.

(56) References Cited

U.S. PATENT DOCUMENTS

| | | | |
|---|---|---|---|
| 6,601,188 B1 * | 7/2003 | Wilding | 714/15 |
| 6,766,467 B1 | 7/2004 | Neal et al. | |
| 2006/0117299 A1 * | 6/2006 | Goldsmith et al. | 717/124 |
| 2007/0008986 A1 | 1/2007 | Xie et al. | |
| 2010/0131796 A1 | 5/2010 | Engelbrecht et al. | |
| 2010/0332473 A1 * | 12/2010 | Brodsky et al. | 707/736 |
| 2012/0144374 A1 * | 6/2012 | Gallagher et al. | 717/128 |

* cited by examiner

*Primary Examiner* — Yair Leibovich
(74) *Attorney, Agent, or Firm* — Suiter Swantz pc llo

(57) ABSTRACT

A method for transparent debug of a hardware queue and recreation of an operational scenario comprising: use of a computer device to: monitor a plurality of inputs and outputs from a plurality of hardware queues associated as parts of a design; receive a request to save from an external source; pause one or more hardware queues upon command; receive hardware queue information from at least one of the paused hardware queues; dump said hardware queue information from at least one paused hardware queue; store the hardware queue information in a data storage connected to the computing device; compare the received information to stored data representative of a functional hardware queue; identify errors and failures in each monitored hardware queue from the comparing and; restore the hardware queue to a previous state.

18 Claims, 5 Drawing Sheets

500

502 monitoring a plurality of hardware queues, the plurality of hardware queues associated as parts of a design 504 receiving a list of target hardware queues 506 monitoring a plurality of inputs from an internal and an external source 508 receiving a request to save from at least one of the internal and external sources 510 sending a command to the plurality of hardware queues to pause at least one hardware queue 512 receiving hardware queue state information from at least one paused hardware queue on the list of target hardware queues 514 receiving hardware queue data entry and historical entry information from at least one paused hardware queue on the list of target hardware queues 516 sending a command to dump said hardware queue data entry and historical entry information from at least one paused hardware queue on the list of target hardware queues 518 storing the hardware queue state, data entry, and historical entry information in a data storage connected to the computing device 520 comparing the received state, data entry, and historical entry information to stored data representative of functional hardware queues 522 identifying errors and failures in each monitored hardware queue from the comparing

*FIG. 5*

600

602 monitoring a plurality of hardware queues, the plurality of hardware queues associated as parts of a design 604 receiving a list of target hardware queues 606 monitoring a plurality of inputs from an internal and an external source 608 receiving a request to save from at least one of the internal and external sources 610 sending a command to the plurality of hardware queues to pause at least one hardware queue 612 receiving hardware queue state information from at least one paused hardware queue on the list of target hardware queues 614 receiving hardware queue data entry and historical entry information from at least one paused hardware queue on the list of target hardware queues 616 sending a command to dump said hardware queue data entry and historical entry information from at least one paused hardware queue on the list of target hardware queues 618 storing the hardware queue state information, data entry, and historical entry information in a data storage connected to the computing device 620 restoring said paused hardware queues to a previous state from information stored in the data storage

*FIG. 6*

HARDWARE QUEUE FOR TRANSPARENT DEBUG

TECHNICAL FIELD

The present disclosure relates generally to the field of digital system error analysis, and more particularly to an improved method for transparent analysis, correction, and history tracking of errors and failures associated with a Hardware Queue.

BACKGROUND

Hardware Queues may consist of a memory, producer input port, producer index pointer, consumer output port, consumer index pointer, and logic to detect full and empty conditions by comparing a consumer pointer to a producer pointer. These hardware queues may access semantics as either last in first out (LIFO) or first in first out (FIFO). Hardware Queues may be used in a variety of ways including elasticity, connecting hardware to hardware, hardware to firmware, firmware to firmware, firmware to software driver and the like. Failures and errors that may occur in Hardware Queue design are often difficult to investigate and cure since accurate evidence of failure may be difficult to locate and track. Errors may include missing items, multiple copies of singular items, non-existent items (output items that were not input) and the like. Causes of these failures and errors are varied, and may include timing issues and issues with the hardware or software attached to the consumer or producer port. Further failures may be caused by FIFO logic problems such as faulty full or empty detect logic, erroneous double index pointer incrementing, or failing to increment the index pointer. The hardware queue in question might be a part of a large chain of queues with intervening hardware and software causing difficult failure location. When analyzing performance of many interrelated hardware queues, it may be difficult to determine which hardware queue is the weak link in a design.

Previous attempts at Hardware Queue failure analysis include a logic analyzer trace of internal signals into or out of the hardware queue. These analysis methods can either be n-board logic analyzer or external (by making the signals available externally through test mux interfaces). The primary disadvantage of this method is that a limited number of hardware queues can be examined at the same time, making the debug process long and tedious, because the failing scenario will have to be created over and over again. Also the failing scenario might take a long time to reproduce.

Therefore, it would be advantageous if a method existed providing for a hardware queue whose state may be paused at any time. Such method may monitor a plurality of hardware queues, receive an input to pause the hardware queues, store various inputs from the hardware queues to a memory, analyze the stored values to diagnose an error, and restore the hardware queues to a previous state to recreate an operational scenario.

SUMMARY

In one aspect of the current invention, a method for improved hardware queue for transparent debug may include but is not limited to using a computer device or processor to accomplish the steps of: monitoring a plurality of hardware queues, the plurality of hardware queues associated as parts of a design; receiving a list of target hardware queues; monitoring a plurality of inputs from an internal and an external source; receiving a request to save from at least one of the internal and external sources; sending a command to the plurality of hardware queues to pause at least one hardware queue; receiving hardware queue state information from at least one paused hardware queue on the list of target hardware queues; receiving hardware queue data entry and historical entry information from at least one paused hardware queue on the list of target hardware queues; sending a command to dump said hardware queue data entry and historical entry information from at least one paused hardware queue on the list of target hardware queues; storing the hardware queue state, data entry, and historical entry information in a data storage connected to the computing device; comparing the received state, data entry, and historical entry information to stored data representative of functional hardware queues; identifying errors and failures in each monitored hardware queue from the comparing.

It is further contemplated an additional aspect of the current invention may include, but is not limited to, receiving the request to save from an internal or external source which may further comprise receiving a request from at least one of an on-device trigger logic, an external trigger, a software trigger, and a firmware trigger. The on-device trigger logic may further comprise a hardware queue full condition and a hardware queue empty condition. The external trigger may further comprise a data corruption. The software trigger may further comprise a data integrity failure. The firmware trigger may further comprise an error interrupt. The data storage connected to the computing device may further comprise a memory location within the device and a memory location external to the device. The data storage connected to the computing device may be of variable size and may be configured to store a history of events. Also, the hardware queue data entry and historical entry information may further comprise head pointers, tail pointers, and history pointers.

In an additional embodiment of the current invention, a method for recreation of an operational scenario may include but is not limited to using a computer device or processor to accomplish the steps of: monitoring a plurality of hardware queues, the plurality of hardware queues associated as parts of a design; receiving a list of target hardware queues; monitoring a plurality of inputs from an internal and an external source; receiving a request to save from at least one of the internal and external sources; sending a command to the plurality of hardware queues to pause at least one hardware queue; receiving hardware queue state information from at least one paused hardware queue on the list of target hardware queues; receiving hardware queue data entry and historical entry information from at least one paused hardware queue on the list of target hardware queues; sending a command to dump said hardware queue data entry and historical entry information from at least one paused hardware queue on the list of target hardware queues; storing the hardware queue state information, data entry, and historical entry information in a data storage connected to the computing device; restoring said paused hardware queues to a previous state from information stored in the data storage.

It is further contemplated an additional aspect of the current invention may include, but is not limited to, receiving the request to save from an internal or external source which may further comprise receiving a request from at least one of an on-device trigger logic, an external trigger, a software trigger, and a firmware trigger. The on-device trigger logic may further comprise a hardware queue full condition and a hardware queue empty condition. The external trigger may further comprise a data corruption. The software trigger may further comprise a data integrity failure. The firmware trigger may further comprise an error interrupt. The data storage connected to the computing device may further comprise a memory location within the device and a memory location external to the device. The data storage connected to the computing device may be of variable size and may be configured to store a history of events. Also, the hardware queue data entry and historical entry information may further comprise head pointers, tail pointers, and history pointers.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 5 is a flow diagram illustrating a logic path found in a preferred embodiment of the present invention.

FIG. 6 is a flow diagram illustrating a logic path found in an additional embodiment of the present invention.

DETAILED DESCRIPTION

Reference will now be made in detail to the subject matter disclosed, which is illustrated in the accompanying drawings.

Figure 1:
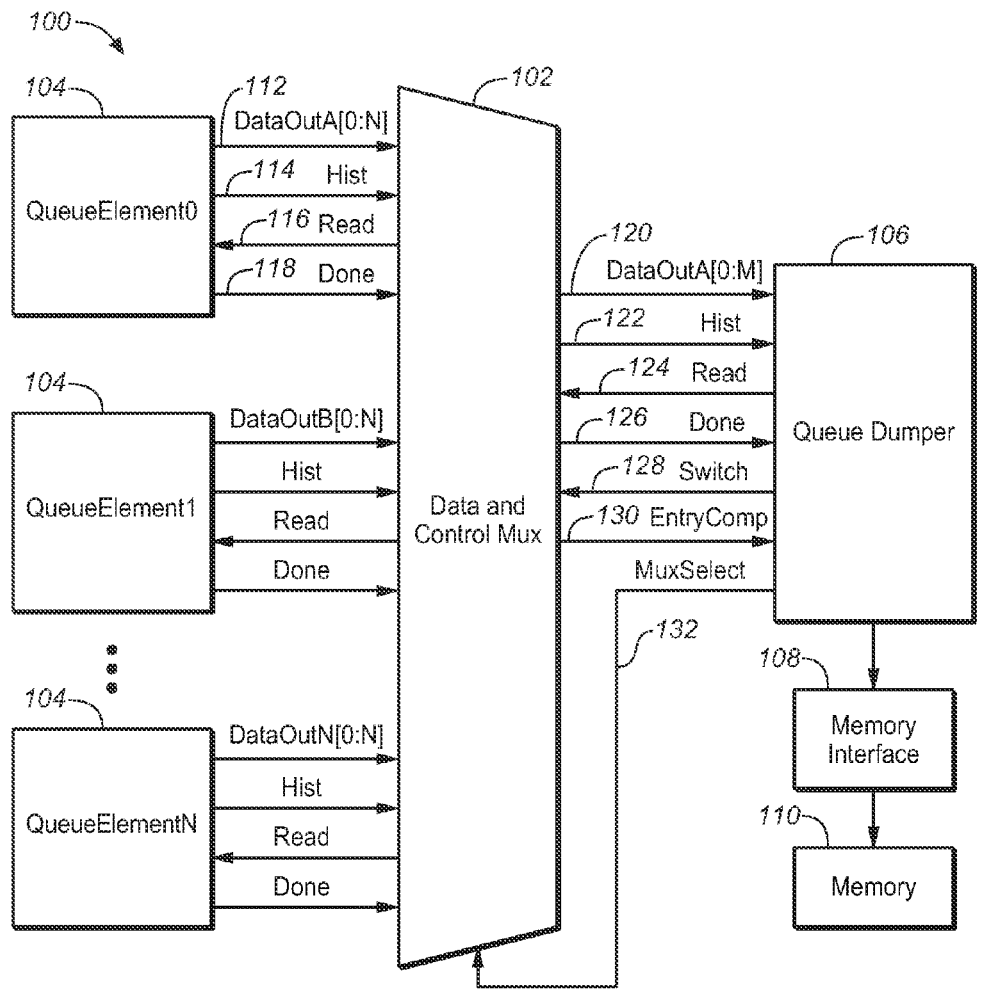
FIG. 1 is a block diagram illustrating a preferred embodiment of the central control unit of the present invention.

Referring to FIG. 1, an overview of a preferred embodiment of the present invention is shown. Method and System 100 may include a central data and control unit 102. The central data and control unit 102 acts as the interface between the hardware queue elements 104 and the memory 110. One preferable function of the central data and control unit 102 may include sending commands to load and save the queue entries from various queue elements into memory locations accessible by external software. Under normal operation, the central data and control unit 102 monitors multiple parameters of each queue elements 104 including DataOut 112, History 114, and Done 118. The central data and control unit 102 sends Read data 116 to each queue element 104. Central data and control unit 102 may take snapshots of queue status over time to create a full timeline of hardware queue states for a particular traffic profile. Queue dumper 106 acts as the conduit for which history data is transmitted through the memory interface 108 to the memory 110. The queue dumper 106 may further provide input to central data and control unit 102 to execute a pause command to one or all the hardware queues depending on switch command 128, read 124, and mux select 132. Queue dumper 106 is configured to receive input from central data and control unit 102, input may include DataOutN 120, history 122, done 126 and entry complete 130. Memory interface 108 includes well known interface between queue dumper 106 and memory 110.

Memory 110 may be of variable size optimally configured to store a timeline of events of multiple hardware queues 104. The memory 110 further may be configured to store contents of a plurality of hardware queues 104 and restore such contents to the respective hardware queues 104 on demand. Contents suitable for storage may include hardware queue state information e.g. empty, full, or done. Similarly, memory 110 may provide storage of hardware queue pointer information e.g. head pointer, tail pointer, history pointer. Such timeline may further be used to create a hardware simulation recreating events leading up to a failure to enhance failure analysis. Optimally, the simulation will match the captured scenario with the desired design of the system allowing for an exact recreation of events leading up to an investigable event. Memory 110 further may include device memory or external memory configured to store contents of hardware queues 104.

Under abnormal operation, central data and control unit 102 may command at least one or all of the plurality of hardware queues 104 to pause. The pause command may be initiated at any time in the operation of the device and may include a single pause command to a single hardware queue or a single pause command to the entire structure of hardware queues in the design. The pause command may further be initiated by triggers found in one or more of software, external interfaces such as software or logic analyzer, and on-board logic. The pause command may be initiated by one of the above elements or by a combination of more than one of the above elements. Once paused, the central data and control unit 102 may examine and save to memory 110 the contents of one or more of the paused hardware queues. The central data and control unit 102 may query the memory 110 to restore one or more hardware queues 104 to a previous state as recorded in one of the snapshots described herein above.

Figure 2:
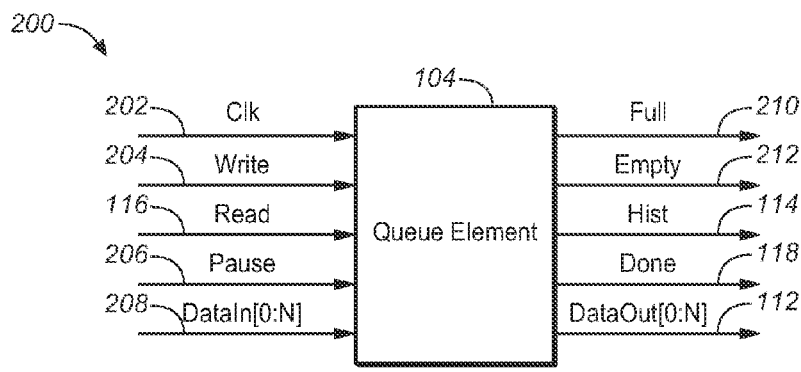
FIG. 2 is a block diagram illustrating the input output signals of the queue element in a preferred embodiment of the present invention.

Referring to FIG. 2, a diagram of signal inputs and outputs to a hardware queue element 104 representative of a preferred embodiment of the present invention is shown. Hardware queue element 104 is representative of a single element or a plurality of elements found in a device. Inputs may include clock 202, write 204, read 116, pause 206, and data in 208 are disclosed. Outputs may include full 210, empty 212, history 114, done 118, and dataout 112 are disclosed.

Figure 3:
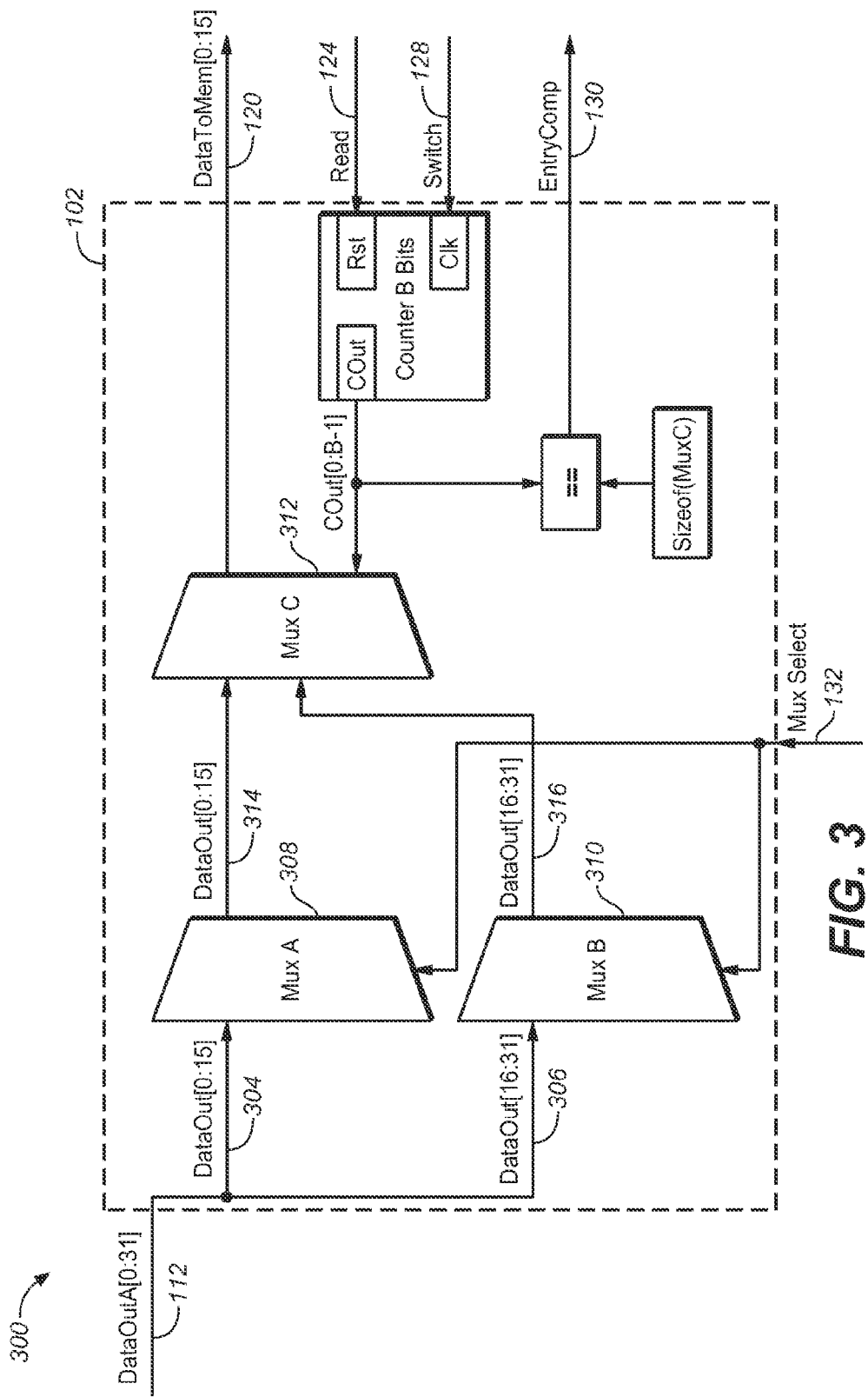
FIG. 3 is block diagram illustrating an implementation of the data and control mux for variable size input first in first out (FIFO) to 16 bit memory representative of a preferred embodiment of the present invention.

Referring to FIG. 3, a diagram illustrating an implementation of the data and control mux for first in first out (FIFO) variable size DataOutA 112 segmentation to 16 bit memory representative of a preferred embodiment of the present invention is shown. Because of the variable size of the data item 112, the data and control mux 102 may be configured to accept an input of an arbitrary long bit stream data item DataOutA 112 and segment the large bit stream data item 112 to a smaller fixed (16 bit) sizes DataToMem 120 acceptable to a data element within the memory (not pictured). The size of the DataOutA 112 may vary based at least on the information the queue element is being used to store.

Variable size DataOutA[0:31] 112 is segmented into DataOut[0:15] 304 and DataOut[16:31] 306. MuxA 308 and MuxB 310 route data to MuxC depending on position of MuxSelect 132. MuxC 312 delivers DataToMem[0:15] 120 in 16 bit format based on position of COut[0:B-1] where B equals the number of bits needed to represent the Sizeof (MuxC) 322. The size of Counter 318 should optimally be selected based on the finished design and should be equal to the size of the largest queue in the design divided by the size of the memory to be used.

Read signal 124 begins the storage operation of the central data and control unit 102. When Reset input is asserted from Read 124, counter output COut 320 returns to zero to begin the read process. MuxC incrementally sends 16 bit data via DataToMem 120 to fully store variable size input DataOutA 112 in 16 bit increments to memory 110 (from FIG. 1). Counter 318 operates as well known in the art incrementally counting clock inputs to determine the number of 16 bit signals sent as DataToMem 120 required to fully store variable size input DataOutA 112.

Figure 4:
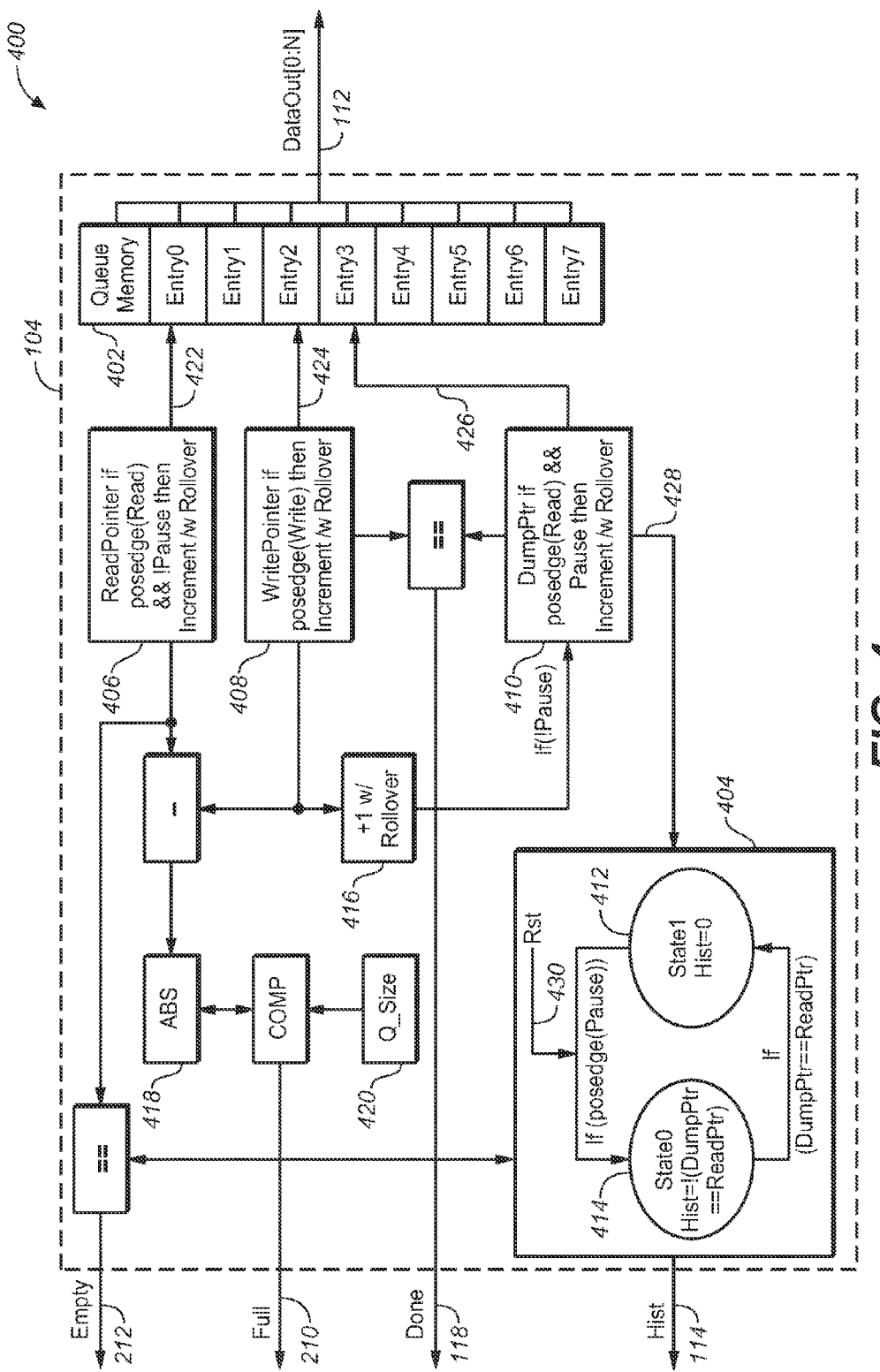
FIG. 4 is a block diagram illustrating an implementation of a sample queue element representative of a preferred embodiment of the present invention.

Referring to FIG. 4, a block diagram illustrating an implementation of a sample queue element representative of a preferred embodiment of the present invention is shown. Within a hardware queue element 104, the various elements interact to produce the previously listed outputs which may include, but not be limited to, Full 210, Empty 212, History 114, Done 118, and DataOut[0:N] 112. Also, DataOut 112 may include signals from ReadPointer 406, WritePointer 408, and DumpPointer 410 depending on the status (Read Write Pause) of positive edge posedge. Queue memory 402 may consist of elements Entry0 through Entry7 and may further be expanded to EntryN elements depending on the desired size of queue. The number of memory locations within the queue 104 will determine the queue size and the number of data items available for storage in queue memory 402. Queue memory 401 may be further configured to accept and store signals from at least three registers comprising ReadPointer 422, WritePointer 424 and DumpPointer 426 in entries located in queue memory 402. The DumpPtr register 410 may allow the queue data entries and the queue historical entries to read from the memory within the hardware queue and further dumped to a memory location that may be accessible to firmware and/or other software for further analysis. Almost the same method could be used with the write interface of the hardware queue to load information into the queue from a location that is accessible by either firmware or software. Queue memory 402 may contain addresses within the memory where information may be stored. Queue memory 402 is sized such that all the memory locations may be addressed by any of the at least three registers. It is contemplated that additional entries in the queue memory numbering greater than EntryN may add history information to the queue memory of the size that it is greater than N.

Operation

In operation, Queue element 104 may receive a positive edge (posedge) command signal assertion via DataIn[0:N] 208 (from FIG. 2) from a source external to the queue element. Such signal may command queue element to enter a Read, a Write, or a Pause state.

A. Read

When the external source asserts a Read signal to posedge via DataIn, the hardware element external to the queue reads the entry by using the current value 422 of ReadPointer register 406 as the address to the queue memory. Queue element 104 may then output the entry in the Dataout signal 112 for capture by the external source. The ReadPointer register 416 is then incremented to the next increment. It is contemplated that the increment may be implemented using half adders. It is to be noted that the register has no carry over so it may wrap to zero after hitting the address of the last memory.

B. Write

When the external source asserts a Write signal to posedge via DataIn, a value is written to the queue memory 402 location using the current value 424 of the WritePointer register 408 as the address to the queue memory 402. The WritePointer register 408 is then also incremented to the next increment. It is contemplated that the increment may be implemented using half adders. It is to be noted that the register has no carry over so it may wrap to zero after hitting the address of the last memory.

C. Empty/Full

It may be beneficial to a user to be made aware of queue element Empty and Full states. If ReadPointer register 406 is equal to the WritePointer register 408 queue element 104 will assert the empty signal 212. It is contemplated the empty signal operation may be accomplished with a network of XOR gates similar to a well-known compare function.

Queue element 104 may determine a full condition by subtracting ReadPointer register 406 from WritePointer pointer register 408 to obtain a difference. The absolute value (ABS) 418 of the difference is compared to Q_Size 420 to determine a quantity and output a Full signal 210 should the quantity indicate such condition exists. It is further contemplated the resulting absolute difference between ReadPointer and WritePointer should be bitwise inverted and one should be added to the bitwise inversion to accurately represent a full condition. It is further contemplated this addition operation may be implemented using half adders.

D. Pause

The external source to queue element 104 may also assert a Pause signal to the queue element 104 triggered by Reset 430 via DataIn. Pause may be beneficial to a user to analyze current queue operation and current queue state prior to a significant event. When queue element 104 is commanded to Pause as indicated at State0 414, the value of WritePointer 408 plus one (preferably implemented with half adders) is loaded in the DumpPtr register 410. The pause signal will also prevent further write to the ReadPointer register 406 and the WritePointer register 408 preventing overwriting during pause. DumpPtr register 410 will advance one increment 428 with each Read assertion. Queue element 104 may further include a history signal 114 indicating historical values stored in the queue. During the assertion of a Pause state triggered by Reset 430, History signal 114 will be available to an external request until the DumpPtr 410 is incremented to point where the DumpPtr register 410 is equal to the ReadPointer register 406. It is contemplated a well-known XOR gate network 414, 404 could be used for comparison. During Pause assertion, if the DumpPtr register 410 is equal to the WritePointer register 408 the done signal will be asserted indicating all values have read from the queue including history entries. The done signal will prevent further write to the DumpPtr register 410 preventing DumpPtf further increment. As soon as Pause signal is de-asserted, the done signal 118 will be de-asserted as well. At this point of Pause state de-assertion and done signal de-assertion the queue element 104 may go back to normal operation as indicated at State1 412.

Referring to FIG. 5 a flow diagram illustrating a logic path found in a preferred embodiment of the present invention is shown. A preferred embodiment of the present invention comprises a method for transparent debug of a hardware queue. The method 500 may use a well-known computer device or processor to accomplish a number of novel steps. In step 502 the method may monitor a plurality of hardware queues, the plurality of hardware queues associated as parts of a design. Parameters monitored may include, but are not limited to a Full 210 or Empty 212 state of the queue element, the History 114, and current Done 118 status (see FIG. 2). In step 504, the method may receive a list of target hardware queues for which an operator may be interested in troubleshooting. It is contemplated the received list of target hardware queues may be generated from a plurality of sources including hardware, software, or human sources but may further include additional sources not listed. In step 506, the method may monitor a plurality of inputs from an internal and an external source. It is contemplated the internal source may comprise internal hardware or software associated with a queue dumper and external sources associated with external hardware, external software, or a plurality of additional external sources. In step 508, the method may receive a request to save from at least one of the internal and external sources. The request to save is one indicator the queue element or elements monitored may require further analysis. In step 510, the method may send a command to the plurality of hardware queues to pause at least one hardware queue. The paused queue element may be analyzed in more detail in the paused state and the current queue state at which the pause command was timely generated may be of peculiar interest to the entity commanding pause. In step 512 the method may receive hardware queue state information from at least one paused hardware queue on the list of target hardware queues. State information may be comprised of Full 210, Empty 212, Hist 114, Done 118, and DataOut[0:N] 112 (see FIG. 2). In step 514, the method may receive hardware queue data entry and historical entry information from at least one paused hardware queue on the list of target hardware queues. Step 516 comprises sending a command to dump said hardware queue data entry and historical entry information from at least one paused hardware queue on the list of target hardware queues. Step 518 may include storing the hardware queue state, data entry, and historical entry information in a data storage connected to the computing device. In step 520, the method may compare the received state, data entry, and historical entry information to stored data representative of functional hardware queues enabling the analysis of the paused queue element. Finally, in step 522, the method may identify errors and failures in each monitored hardware queue from the comparing.

Referring to FIG. 6 a flow diagram illustrating a logic path found in an additional embodiment of the present invention is shown. Embodiments of the present invention ma include a method 600 for recreation of an operational scenario. The method 600 may comprise using a computer device or processor to accomplish the novel enumerated steps. In step 602, the method may monitor a plurality of hardware queues, the plurality of hardware queues associated as parts of a design. Step 604 may receive a list of target hardware queues. Step 606 may include monitoring a plurality of inputs from an internal and an external source. In step 608, the method may receive a request to save from at least one of the internal and external sources. Step 610 may comprise sending a command to the plurality of hardware queues to pause at least one hardware queue. In step 612, the method may receive hardware queue state information from at least one paused hardware queue on the list of target hardware queues. Step 614 comprises receiving hardware queue data entry and historical entry information from at least one paused hardware queue on the list of target hardware queues. In step 616, the method may send a command to dump said hardware queue data entry and historical entry information from at least one paused hardware queue on the list of target hardware queues. Step 618 comprises storing the hardware queue state information, data entry, and historical entry information in a data storage connected to the computing device. Finally, in step 620, the method may restore said paused hardware queues to a previous state from information stored in the data storage.

In a further aspect of the present disclosure, a goal of the present invention may be to recreate failing operational scenarios by allowing hardware queue states to be restored from memory immediately after the state is stored to memory. An immediate restoration may aid an operator in error and failure analysis.

A further goal of the present invention may be to allow hardware validation of a completed system. Such validation may be accomplished by aiding in the recreation of simulation scenarios on implementation of the design.

An additional goal of the present invention may be to enable a user to examine the contents of every hardware queue at a particular failure point or during a particular condition. This ability may allow for exact error analysis in situations of continuous and multiple failures.

An additional goal of the present invention may be to enable a user to analyze simple performance data. By taking a snapshot of FIFO and examining how many items are in each hardware queue, a user may discover which hardware queue or queues may be the weak link in a design.

It should be recognized that while the above description describes the concept of improved hardware queue for transparent debug, the above description does not represent a limitation but merely an illustration.

In the present disclosure, the methods disclosed may be implemented as sets of instructions or software readable by a device. Such software may a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for transparent debug of a hardware queue, comprising: using a computer device or processor to accomplish the steps of:

monitoring a plurality of hardware queues, the plurality of hardware queues associated as parts of a design;

receiving a list of target hardware queues;

monitoring a plurality of inputs from an internal and an external source;

receiving a request to save from at least one of the internal and external sources;

sending a command to the plurality of hardware queues to pause at least one hardware queue, the command based on the request to save;

receiving hardware queue state information from at least one paused hardware queue on the list of target hardware queues;

receiving hardware queue data entry and historical entry information from at least one paused hardware queue on the list of target hardware queues;

sending a command to dump said hardware queue data entry and historical entry information from at least one paused hardware queue on the list of target hardware queues;

storing the hardware queue state, data entry, and historical entry information in a data storage connected to the computing device;

comparing the received state, data entry, and historical entry information to stored data representative of functional hardware queues;

identifying errors and failures in each monitored hardware queue from the comparing.

2. The method of claim 1, wherein receiving the request to save from an internal or external source further comprises receiving a request from at least one of an on-device trigger logic, an external trigger, a software trigger, and a firmware trigger.

3. The method of claim 2, wherein the on-device trigger logic further comprises a hardware queue full condition and a hardware queue empty condition.

4. The method of claim 2, wherein the external trigger further comprises a data corruption.

5. The method of claim 2, wherein the software trigger further comprises a data integrity failure.

6. The method of claim 2, wherein the firmware trigger further comprises an error interrupt.

7. The method of claim 1, wherein the data storage connected to the computing device further comprises a memory location within the device and a memory location external to the device.

8. The method of claim 1, wherein the data storage connected to the computing device is of variable size and is configured to store a history of events.

9. The method of claim 1, wherein the hardware queue data entry and historical entry information further comprises head pointers, tail pointers, and history pointers.

10. A method for recreation of an operational scenario, the method comprising:

using a computer device or processor to accomplish the steps of: monitoring a plurality of hardware queues, the plurality of hardware queues associated as parts of a design;

receiving a list of target hardware queues;

monitoring a plurality of inputs from an internal and an external source;

receiving a request to save from at least one of the internal and external sources;

sending a command to the plurality of hardware queues to pause at least one hardware queue, the command based on the request to save;

receiving hardware queue state information from at least one paused hardware queue on the list of target hardware queues;

receiving hardware queue data entry and historical entry information from at least one paused hardware queue on the list of target hardware queues;

sending a command to dump said hardware queue data entry and historical entry information from at least one paused hardware queue on the list of target hardware queues;

storing the hardware queue state information, data entry, and historical entry information in a data storage connected to the computing device;

restoring said paused hardware queues to a previous state from information stored in the data storage.

11. The method of claim 10, wherein receiving the request to save from an internal or external source further comprises receiving a request from at least one of an on-device trigger logic, an external trigger, a software trigger, and a firmware trigger.

12. The method of claim 11, wherein the on-device trigger logic further comprises a hardware queue full condition and a hardware queue empty condition.

13. The method of claim 11, wherein the external trigger further comprises a data corruption.

14. The method of claim 11, wherein the software trigger further comprises a data integrity failure.

15. The method of claim 11, wherein the firmware trigger further comprises an error interrupt.

16. The method of claim 10, wherein the data storage connected to the computing device further comprises a memory location within the device and a memory location external to the device.

17. The method of claim 10, wherein the data storage connected to the computing device is of variable size and is configured to store a history of events.

18. The method of claim 10, wherein the hardware queue data entry and historical entry information further comprises head pointers, tail pointers, and history pointers.

* * * * *